United States Patent [19]
Wedell et al.

[11] Patent Number: 5,586,926
[45] Date of Patent: *Dec. 24, 1996

[54] METHOD FOR TEXTURING A METALLIC THIN FILM

[75] Inventors: Eric D. Wedell, White Bear Lake; Darlene N. Strecker, Oakdale, both of Minn.

[73] Assignee: Minnesota Mining and Manufacturing Company, St. Paul, Minn.

[ * ] Notice: The portion of the term of this patent subsequent to Aug. 31, 2012, has been disclaimed.

[21] Appl. No.: 301,254

[22] Filed: Sep. 6, 1994

[51] Int. Cl.⁶ ............................................. B24B 29/00
[52] U.S. Cl. .................... 451/59; 451/36; 451/307; 451/299
[58] Field of Search ...................... 451/36, 59, 63, 451/41, 306, 307, 299

[56] References Cited

U.S. PATENT DOCUMENTS

| | | | |
|---|---|---|---|
| 4,255,164 | 3/1981 | Butzke et al. | 51/295 |
| 4,347,689 | 9/1982 | Hammond | 451/307 |
| 4,514,937 | 5/1985 | Gehrung et al. | 451/307 |
| 4,576,612 | 3/1986 | Shukla et al. | 51/295 |
| 4,974,373 | 12/1990 | Kawashima et al. | 51/295 |
| 5,012,618 | 5/1991 | Price et al. | 451/307 |
| 5,104,421 | 4/1992 | Takizawa et al. | 51/295 |
| 5,307,593 | 5/1994 | Lucker et al. | 51/281 SF |

FOREIGN PATENT DOCUMENTS

| | | | |
|---|---|---|---|
| 0438671 | 7/1991 | European Pat. Off. | B24D 3/20 |
| 3-55155 | 3/1991 | Japan | B24B 11/00 |
| 5-228845 | 9/1993 | Japan | B24D 11/00 |

*Primary Examiner*—James G. Smith
*Assistant Examiner*—Eileen P. Morgan
*Attorney, Agent, or Firm*—Gary L. Griswold; Walter N. Kirn; Paul W. Busse

[57] ABSTRACT

Method for texturing a surface of a metallic thin film of a magnetic disk substrate comprising the steps of: (a) frictionally contacting the surface of the metallic thin film with an abrasive article, wherein the abrasive article comprises an abrasive coating including a water-soluble binder and abrasive particles, wherein the abrasive coating is adhesively attached to a flexible foraminous fibrous backing; and (b) abrading the surface of the metallic thin film by moving the metallic thin film and the abrasive article relative to one another with the abrasive coating in contact with an aqueous liquid solution to form scratches in the surface of the metallic thin film, wherein the liquid solution is free of abrasive particles before contact is initiated with the abrasive coating.

19 Claims, 2 Drawing Sheets

METHOD FOR TEXTURING A METALLIC THIN FILM

BACKGROUND OF THE INVENTION

1. Field of the Invention

The present invention relates to a method for texturing a metallic thin film with an abrasive article, wherein the abrasive article comprises an erodible abrasive coating attached to a foraminous fibrous backing.

2. Description of the Related Art

Personal computers and their usage have become pervasive in contemporary times. Many personal computers contain a rigid memory disk or hard drive. A hard drive involves a rigid thin film metal-coated disk or nonmetal disk as the substrate of the magnetic medium. In one conventional arrangement, the thin film rigid disks are manufactured by electroless nickel plating a thin-film of nickel or nickel alloy onto an aluminum base, such as forming nickel/phosphorus (Ni-P) coating on the aluminum base. The Ni-P coating is then polished to a very fine, mirror-like finish. After polishing, the Ni-P coating is textured, followed by the application of a magnetic coating(s) thereon to form the magnetic medium.

The texturing portion of this process is critical to the ultimate performance of the rigid disks. The texturing process preferably results in a random pattern of uniform scratches with sharply defined edges in a substantially circumferential direction relative to the center of the rigid disk.

Texturing accomplishes a number of purposes. It improves the aerodynamics between the computer head (which reads and writes data on the disk) and the thin film rigid disk as the disk spins beneath the head. It also improves the magnetic properties of the coated disks. The scratches formed during texturing make it easier for the head to distinguish bytes of information between tracks on the disk. The texturing also preserves the separation between the computer head and the rigid disk when the computer is first turned on. When the computer is turned on and energized, the rigid disk will begin to spin. If the disk is smooth and untextured, this head/disk contact makes it onerous for a disk to start spinning. This phenomenon is referred to as stiction/friction in the argot of the computer industry.

To provide texturing which can deliver these and other advantages, it is imperative that the profile and topography of the texturing scratches formed in the surface of the thin film are carefully managed. For instance, if the scratches formed are too deep there may be a potential loss of data on the rigid disk. Also, it is important that the surface roughness imparted into the textured surface is relatively uniform across the width of the surface. That is, the undulations of the scratches should be as regular in pitch as possible.

Also, the portion of the metal thin film portion of the substrate abraded away during texturing is known in the industry as swarf. Practice has shown that excess swarf generated during the use of some lapping films is still apt to be present at the interface of the abrasive coating and the substrate work surfaces. Therefore, there remains some opportunity for the swarf to become attached to form high spots on the textured rigid substrate where conventional lapping films are employed. That particular phenomenon is known in the industry as reweld. Those high spots are highly undesirable as they can collide with the computer head during use, which can cause a loss of data and/or head damage as a result of the collision.

Prior to the present invention, the texturing process for thin metal films of magnetic disks was traditionally accomplished by using a loose abrasive slurry. The loose abrasive slurries provide substantially circumferential scratches that have sharply defined edges having the requisite depth. Loose abrasive slurries are, however, accompanied by a number of disadvantages. These include the inconvenience of handling the required volume of the slurry, the required agitation to prevent settling of the abrasive granules and to assure a uniform concentration of abrasive granules at the grinding interface, and the need for additional equipment to prepare, handle and also recover and recycle the abrasive slurry. Additionally, the loose slurry itself must be analyzed to assure its quality and dispersion stability requiring additional costly man hours. Furthermore, pump heads, valves, feed lines, grinding laps, and other parts of the slurry supply equipment which contact the slurry show undesirable wear. Further yet, the loose abrasive slurries are untidy; creating a large amount of debris and waste in and about the vicinity of the texturing operation. As a result, the thin film rigid disks, after texturing, must be thoroughly cleaned to remove any residues left on their surface from the abrasive slurry.

Not surprisingly, to overcome the numerous disadvantages associated with loose abrasive slurries, integral coated abrasive lapping films have been used to texture the thin film rigid disks. An example of such a product is "IMPERIAL" Lapping film (Type R3) commercially available from 3M Company, St. Paul, Minn. This lapping film comprises a polymeric film backing having an abrasive coating layer bonded thereto. The abrasive coating layer includes very fine abrasive particles (average particle size less than 10 micrometers) dispersed in a binder that is coated on the polymeric film and solidified to form a thin abrasive coating layer (about 10–15 micrometers). The surface profile of the abrasive coating is essentially flat other than the partial protrusions formed of some of the fine abrasive particles. During use, the lapping film abrades a portion of the substrate surface, thereby texturing the surface of the substrate. Similarly, U.S. Pat. No. 4,974,373 to Kawashima et al. describes an abrasive tool suited for use in lapping, polishing, texturing, and various other finishes of precision machine parts, mentioning hard disks and magnetic heads, as well as ceramics, plastics, and jewels, involving abrasive powder particles fixed in a separated proximity to each other in a binder resin coat disposed on a plastic film base to form the abrasive tool. However, in addition to problems with reweld, conventional lapping films may not provide scratches having edges as sharp and/or clean as those produced by the loose abrasive slurries. These lower quality scratch edges may degrade the quality of the disks manufactured using lapping film for the texturing process.

As a recent alternate proposal to use of such lapping films for texturing, the use of porous nonwoven cloths coated on a surface with an abrasive layer has been advanced as another method to uniformly texture thin film metal or metal alloy coated rigid disks before application of the magnetic coatings in a clean process that generates high quality scratches and avoids the problem of reweld. For example, U.S. Pat. No. 5,307,593 (Lucker et al.) discloses a nonwoven substrate coated with an abrasive layer that is used in a method for texturing magnetic media substrates having a thin-film metal or metal alloy coating, where the porous nonwoven substrate provides advantages such as the ability to collect and entrap the swarf and debris during the abrasion procedure away from the work interface, among other things. Lucker et al. employ a water-insoluble binder in the abrasive layer used to texture a thin-film metal.

U.S. Pat. No. 5,236,762 (Suzuki et al.), corresponding to European Patent Application No. 0 438 671, discloses an abrasive film suitable for use in the finishing of magnetic heads, magnetic disks, micrometers, watches, molds and so forth, comprising a film substrate having an abrasive layer on at least one side thereof, wherein the abrasive layer contains abradant particles unifromly dispersed in at least one binder selected from water-soluble macromolecular substances and water-dispersible macromolecular substances. However, the film substrates disclosed in Suzuki et al. are resinous nonfibrous films. A continuous resinous film, inherently, would have no porosity and would aggravate loading problems on the working side of the abrasive article.

What is desired in the field of rigid disk texturing is an abrasive product with the convenience of a coated abrasive product that produces results similar to that obtained with a loose abrasive slurry while avoiding the the aforementioned disadvantages associated with loose abrasive slurries.

In general, the provision of erodible abrasive films to simulate a loose slurry has been proposed. For example, U.S. Pat. No. 4,255,164 (Butzke et al.) teaches an abrasive article for use in fining ophthalmic lenses. The article comprises a flexible backing sheet and a brittle microcellular coating formed of water-insoluble modified phenol or urea formaldehyde resinous binding material, which will disintegrate during use, creating an abrasive slurry.

Also, U.S. Pat. No. 4,576,612 (Shukla et al.) teaches a polishing pad restricted to polishing glass or plastic ophthalmic lenses. The polishing pad of Shukla et al. is described as including a flexible substrate and a flexible matrix coated on said substrate involving polishing particles contained in a binder matrix composed of a latex material and a water soluble polymer. Shukla et al. refers to usage of water soluble polymers alone as the abrasive particle binder, presumably for glass polishing operations, sans the latex (viz. acrylic latex) component. However, Shukla et al. characterized the outcome for that apparent glass polishing operation as being poor.

U.S. Pat. No. 5,104,421 (Takizawa et al.) teaches a polishing pad comprising a substrate coated with a blend of abrasives and a water-soluble cellulose ether binder. Takizawa et al. also describe conventional sheet-like abrasives of sand papers and polishing tapes manufactued by bonding abrasive grains or particles on the faces of paper or fabric sheet-like substrates through synthetic water-soluble high molecular compounds such as polyvinyl alcohol or natural substances such as gelatin. However, Takizawa et al. indicate that such conventional polishing tapes manufactured by using such water-soluble bonds have no waterproofness and poor bonding strength resulting in swift falling grains from the faces of sand paper.

JP 5-228845, published 7 September 1993, teaches a polishing film for texturing of magnetic disk substrates, comprising a polymeric film and an abrasive layer comprising abrasive particles and a water soluble resin, where the abrasive particles are released from the film substrate during use in an aqueous environment.

SUMMARY OF THE INVENTION

The present invention provides a method for texturing a metallic thin film of a magnetic disk with a self-slurrying, foraminous-backed abrasive sheet article to provide a regular surface finish therein with reduction of self-welding problems. The method of the present invention also minimizes the loading problems attendant to nonporous-backed polishing films and the liquid handling steps, untidiness and equipment costs associated with the use of conventional loose abrasive slurries.

In one embodiment, the method of the present invention for texturing a surface of a metallic thin film of a rigid magnetic disk substrate comprises frictionally contacting the surface of the metallic thin film with an abrasive article comprising an abrasive coating on a flexible foraminous fibrous backing, wherein the abrasive coating comprises a water-soluble binder which releasably bonds therein fine abrasive particles; and then abrading the surface of the metallic thin film by moving the metallic thin film and the abrasive article relative to one another with the abrasive coating in contact with an aqueous liquid solution to form scratches in the surface of the metallic thin film, where the liquid solution is free of abrasive particles as supplied from its source up until contact with the abrasive coating is initiated.

A small amount of water only solution, or other aqueous liquid which is supplied as an abrasive particle-free solution, is brought into contact with the surface of the abrasive coating of the abrasive article used in the method of the invention, as a prewetting solution, preferably, and/or during the abrading procedure itself, to permit the sheet to create its own slurry in situ during the texturing operation, while allowing the user to start with a clean, easily handled dry sheet. The abrasive sheet used in the method of the present invention includes a coating which constitutes a dry abrasive slurry bonded to a backing which erodes during use and gradually forms an effective loose abrasive slurry capable of texturing metallic thin films at least as well as conventional loose slurries. The abrasive coating composition is prepared, coated, and dried to yield a coating which will erode or disintegrate and release its loading of abrasive particles at a controlled rate under use conditions. The gradually released abrasive particles are capable of rotating freely and therby generate a uniformly scratched surface.

That is, the clean and uniform grooves are achieved by prewetting the abrasive constructions so that the water-soluble binder will dissolve creating a pseudo slurry for texturing the disk. This prewetting of the abrasive construction can be done approximately 2–3 cm in front of the texturing interface so as to ensure that the binder is suitably dissolved.

In a further embodiment, the abrasive article is useful for texturing nickel and nickel alloy plated (thin film) rigid memory disks. The nickel coating, such as Ni-P, can be formed on a rigid metal base selected from metal, glass or ceramic material. The magnetic disk substrate comprises a rigid base material having opposing major surfaces, the metallic thin film, such as Ni-P, formed on at least one of the major surfaces. In one preferred embodiment, the abrasive article used in the method of the invention includes a nonwoven backing with a barrier coating, where the nonwoven backing is slurry coated with a dispersion of water soluble resin and abrasive particles.

The preferred water soluble binders include polyvinyl alcohol, polyacrylamide, or polyethylene glycol, singly or in any combinations thereof. The fibrous backings used in the abrasive article of the method of the invention preferably include fibers comprising cotton, polyester, and their blends as woven or nonwoven (paper-like) materials. The preferred backing is a foraminous (porous) polyester fiber nonwoven material. In one embodiment, the abrasive coating comprises the abrasive particles and the water-soluble binder in a weight ratio of 7:1 to 3:1, respectively. The abrasive particles generally have an average particle size of about 0.05 to about 5 micrometers, preferably between 0.1 to 3 micrometers. In one preferred embodiment, the abrasive particles comprise aluminum oxide, such as white aluminum oxide.

In another further embodiment of the inventive method, the abrasive article comprises a sheet configuration frictionally conveyed over the surface of the metallic thin film by reel-to-reel means. In general, the abrading step forms substantially circumferential scratches in the surface of the metallic thin film with an Ra of between about 20 angstroms to about 70 angstroms, preferably an Ra between about 30 angstroms to about 50 angstroms. In another embodiment, the rigid magnetic disk substrate comprises a circular shape and a central axis, and further wherein the step of abrading further comprises rotating the rigid substrate about the central axis to form substantially circumferential scratches. Further, the step of rotating further comprises forming the circumferential scratches at a speed of at least 7.5 meters per minute at an interface between the metallic thin film and the abrasive article. In yet another embodiment, The step of abrading further comprises oscillating the abrasive article in a direction substantially perpendicular to a direction of travel of the rigid substrate during the abrading. The method of the invention also contemplates the additional step of forming at least one magnetic layer on the textured (abraded) surface of the metallic thin film.

Other features, advantages, and constructs of the invention will be better understood from the the following description of the figures and the preferred embodiments of the invention.

DETAILED DESCRIPTION OF THE PREFERRED EMBODIMENTS

The present invention provides a method for texturing thin-film metal or metal alloy coated rigid disks with an abrasive article comprising an abrasive coating, in which abrasive particles are dispersed in a water soluble binder, coated on a surface of a foraminous fibrous backing sheet. It is preferred that the abrasive particles be uniformly dispersed throughout the water soluble binder in the abrasive coating. In this form, as the abrasive article is used under wet conditions, the water soluble binder softens and releases abrasive particles, thereby exposing fresh abrasive particles still held in the undissolved binder. It is this combination of the water soluble binder and a porous fibrous backing that results in an improved texturing operation on a thin-film metal layer of a magnetic substarte. The water soluble binder allows for a relatively fast erodibility and the porous backing allows a means to remove or pull the swarf and used abrasive particles away from the polishing interface. Thus, while not desiring to be bound to any theory at this time, it nonetheless is believed that during polishing, that only fresh abrasive particles are presented at the interface of the work surface and abrasive sheet article during polishing. Shortly thereafter, the worn abrasive particles are expelled and removed from the polishing interface. Additionally, it is theorized that the water used during polishing softens the water soluble binder and as a result a loose, thick paste of abrasive particles and water soluble binder is formed. This paste, or loose abrasive slurry then polishes the workpiece surface. The abrasive particles have more limited movement than with slurries, and hence produce surface finishes uniquely suited to thin film disks.

In one embodiment, the process of texturing a magnetic medium disk substrate using the method of the present invention includes providing a rigid substrate that has a thickness between 0.75 to 1.25 millimeter. The magnetic disk substrates include a thin-film metal layer formed on a rigid metal or nonmetal material. The disk substrate preferably involves a thin-film metal or metal alloy coating applied onto a metal base, where the metal base is preferably an aluminum alloy. however, the nonmetal materials usable as substrate for the thin-film metal preferably are glass or ceramic. As can be understood, the "magnetic substrate" of the invention means a thin film member constituted by plural distinct superposed layers, which is susceptible to application and adherence of a magnetic layer thereon. The "rigid magnetic disk substrate" means a generally circular disk constituted of the metallic thin film and a rigid base layer formed into an integral article, which is susceptible to application and adherance of a magnetic layer thereon.

Figure 1:
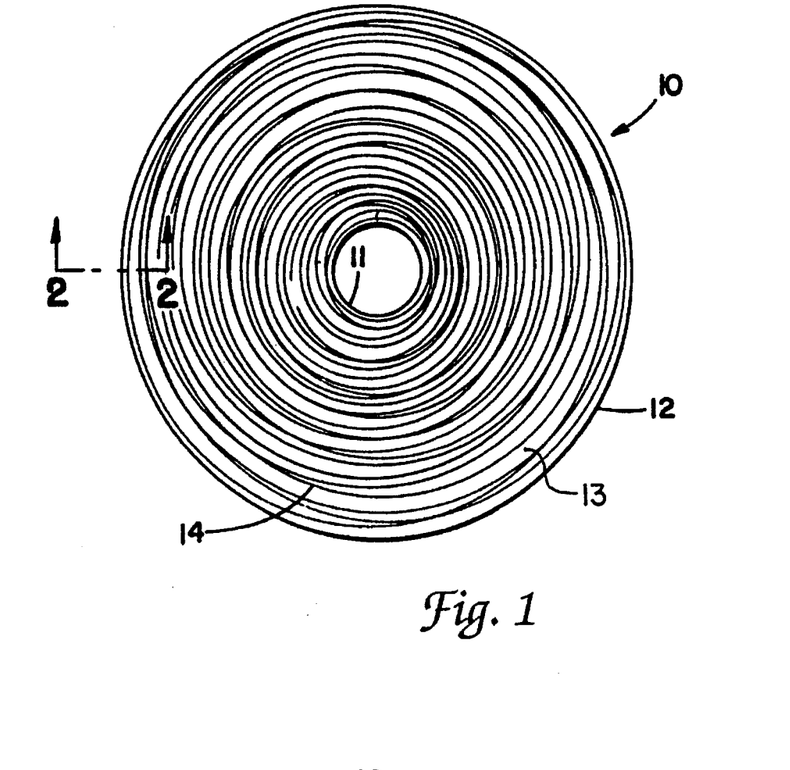
FIG. 1 is a top view of a thin-film metal coated rigid disk substrate textured according to the method of the present invention.

Referring to the rigid substrate for a memory disk as illustrated in FIG. 1, the rigid substrate disk 10 is generally circular in shape with center hole 11. A thin-film metal or metal alloy coating 13 is applied over at least one surface 12 of a disc-shaped metal base 25 (shown in FIG. 2). The thin-film metal coating is typically applied to both opposite major surfaces of the rigid substrate disk 10.

For purposes of this invention, the "metallic thin film" coating includes metal or metal alloy coatings. The metal is typically applied by electroless nickel plating, although other coating techniques may be employed. The metallic thin film coating thickness generally is in a range between 5 to 20 micrometers, and more typically is about 15 micrometers. The preferred nickel coating includes phosphorous to prevent the nickel from having magnetic properties. The preferred coating typically contains from about 5 to 20% phosphorous, usually about 12% phosphorous. The preferred metal coating does not contain any appreciable amounts of metal oxides, i.e., the amount of metal oxides by weight are typically less than 0.01%.

After metal coating, but before texturing, the rigid disk substrate surface 12 can be polished to a very fine finish, usually by a conventional loose abrasive slurry. Loose abrasive slurries comprise a plurality of abrasive particles (typically having an average particle size less than 5 micrometers) dispersed in a liquid medium, such as water or an organic solvent. After polishing with the loose abrasive slurry, the metal coating has a very fine random scratch pattern or orientation.

The arithmetic average of all distances from the centerline of the roughness profile of the surface of the polished metal coating preferably has a value of less than 20 angstroms.

That surface finish value is referred to herein as Ra, and is also known as Center Line Average. As referred to in connection with the present invention, Ra is measured using a Wyko TOPO-3D Interferometer (purchased from Wyko Corp., Tucson, Ark.) with a 40X objective lens. It will be understood that other methods of measuring Ra could be used in connection with the method of the present invention, with appropriate adjustments to the preferred values of Ra as discussed herein.

After polishing, the metal coating on surface 12 is ready to be textured according to the method of the present invention. Texturing of the metal coating on the surface 12 results in a random pattern of scratches 14 in a substantially circumferential direction relative to the center of the rigid disk substrate 10. The scratches are preferably nonconcentric with the center of the rigid disk substrate 10, but preferably substantially circumferential, producing scratches that randomly cross each other.

Figure 2:
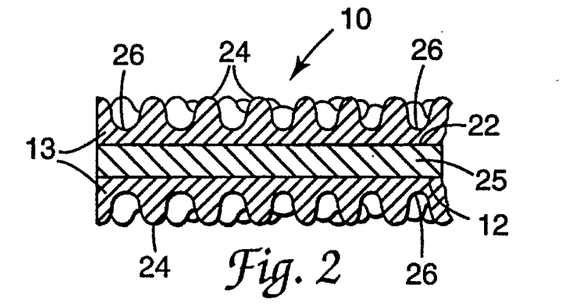
FIG. 2 is a cross-sectional view of a textured thin-film metal coated disk substrate produced by the method of the present invention taken along direction 2—2 of FIG. 1.

Referring now to the partial cross-sectional view of FIG. 2, the rigid substrate disk 10 comprises metal base 25 with a textured metal coating 13 formed on both substrate surfaces 12 and 22, although it will be understood that the coating could be present on only one major surface 12. Scratches 14 are irregular in nature and comprise high regions 24 and low regions 26. The Ra of the scratches 14 is typically between about 20 angstroms (0.0020 micrometers) and about 70 angstroms (0.0070 micrometers), preferably 30 to 50angstroms. The width and height of the scratches 14 do not have to be uniform, although the scratches should not be excessively wide or deep.

The texturing process results in an increase in the exposed surface area of the metal coating(s) 13. The rougher surface reduces stiction/friction with the computer head and the substantially circumferential direction of the scratches enables better differentiation between data tracks.

Although the illustration in FIG. 2 involved a substrate comprised of metal base coated with a thin film of metal or metal alloy, it is to be understood that the present invention also contemplates applying the texturing method of the present invention to substrates made of glass or ceramic material which have no metal or metal alloy thin film coating formed on a surface thereof. Instead, the original surface(s) of the glass or ceramic substrate is directly subjected to the texturing method of the present invention. The glass substrate material can be made of a hard amorphous glass material such as a fused mixture of the silicates of the alkali and alkaline-earth or heavy metals. The ceramic substrate material can be constituted by various hard materials made by shaping and then firing a nonmetallic mineral, such as clay, at a high temperature. These ceramic materials include ceramic alloys, such as silicon nitride, silicon carbide, zirconia, and alumina.

Figure 3:
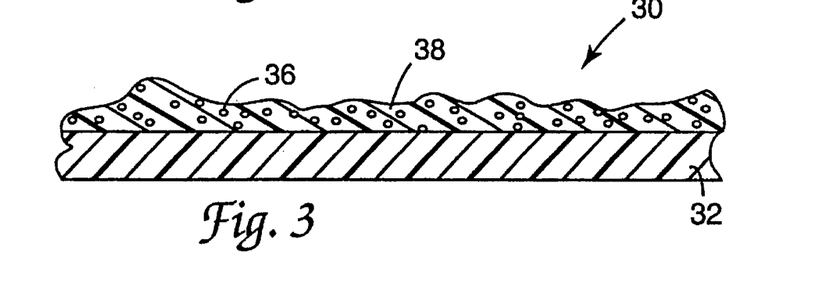
FIG. 3 is a cross-sectional view of an abrasive article used in the method of the present invention.

Referring to FIG. 3, an abrasive article 30 of the present invention, includes a fibrous backing 32 having abrasive particles 36 and binder 38. The binder 38 is a water soluble binder. Immediately before use of the abrasive article of the present invention in a texturing operation, the abrasive article should be exposed to a water or aqueous solvent source. This water exposure will penetrate into the fibrous backing 32 and water soluble binder 38, softening the binder 38.

The fibrous backing is a porous, non-film backing. It can be either a woven or a non-woven substrate. Examples of non-wovens include knitted, lofty non-woven, and paper-like substrates. The substrate can be made of staple fibers, spun staple fibers, extruded fibers, etc. It has been found that a porous backing is greatly desired over a film backing (such as polyester or polyester theraphthalate) due to its ability to remove swarf and debris from the texturing surface.

A porous backing is not completely sealed across its width and/or length. For purposes of this invention, a "porous" backing can be determined by the following Porosity Test.

POROSITY TEST

The dry backing, prior to application of the abrasive coating, is installed on a Gurley Densitometer and the amount of time was measured (in seconds) to allow 100 cubic centimeters of air to pass through the backing. This porosity test is well known in the textile industry. Briefly, the sample backing to be tested is secured at one end of a hollow metal cylinder of the densitometer. A piston that fits very tightly within the cylinder is then raised to allow exactly 100 cubic centimeters of air at room temperature and pressure into the space between the backing and piston. A timer is started at the exact moment when the piston begins to fall by the force of gravity toward the backing. The time is measured for the 100 cubic centimeters of air to pass through the backing. If the time is less than 100 seconds the backing is considered foraminous or porous for purposes of this invention. Preferably, the time needed for the 100 cc of air to pass through the backing will be less than 50 seconds for optimal porosity in this invention. If the time is greater than 100 seconds, the backing is considered to be sealed, or nonporous.

The porous backing is a key aspect of this invention. During the texturing process, swarf is generated; swarf is the term for the material abraded away or removed from the metal coating by the coated abrasive article. As discussed above the texturing process is done in a wet environment. Due to its porous nature, the swarf is able to penetrate into the backing and be removed from the abrading interface. If the swarf is not removed from the abrading interface, then the swarf can become deposited on the high regions of the scratches in the textured metal coating. This phenomena can lead to interference between the rigid disk and the computer head. This interference can potentially lead to a crash of the computer head.

The preferred fibrous backing for the present invention is a nonwoven backing. A nonwoven can be described as a matrix of a random distribution of fibers. This matrix is usually formed by bonding the fibers together either autogeneously or by an adhesive. Examples of nonwoven forms suitable for this invention include staple bonded, spun bonded melt blown, wet laid, needle punched or thermobonded. A nonwoven is typically porous, having a percentage of open space in the total web volume of about 15% or more. Nonwovens are further described in "The Nonwoven Handbook" edited by Bernard M. Lichstein, published by the Association of the Nonwoven Fabrics Industry, New York, 1988.

The fibers in the porous fibrous backing can be natural or synthetic. Examples of fibers include: glass fibers, carbon fibers, mineral fibers, organic fibers, or ceramic fibers. The organic fibers can be natural or synthetic. Examples of typical synthetic fibers include polyvinyl alcohol fibers, rayon, polyethylene, polypropylene, nylon fibers, polyester fibers, phenolic fibers, aramid fibers, and combinations. Examples of natural fibers include cellulose, hemp, kapok, flax, sisal, jute, cotton, silk, manila, and combinations thereof.

Additionally, since the particle size of the abrasive particles is relatively small, i.e., less than 25 micrometers, it is preferred that the fiber in the nonwoven backing be relatively fine. It is preferred that the fiber diameter be less than about 30 micrometers, preferably less than 20 micrometers.

The thickness of the fibrous porous backing generally ranges from 25 to 800 micrometers, preferably between 100 to 375 micrometers. The weight of the backing generally ranges from 7 to 150 grams/square meter, preferably between 17 to 70 grams/square meter. It is within the scope of this invention, to have only one layer of the backing or to have multiple layers forming the backing. These multiple layers can range from 1 to 10 nonwoven or woven layers, preferably between 2 to 5 layers.

The porous backing may further contain an adhesive to help bond the fibers together. However, the amount of the adhesive should not be so high that the backing is sealed. Examples of such adhesives include resin emulsions like acrylonitrile butadiene emulsions, acrylic emulsions, butadiene emulsions, butadiene styrene emulsions, and combinations thereof. Still other adhesives include thermosetting resins like phenolic resins, acrylate resins, epoxy resins, urea-formaldehyde resins, urethane resins, and combinations thereof.

The backing of the invention may additionally comprise other additives that are well known in the art such as toughening materials, shape stabilizers, fillers, dyes, pigments, wetting agents, surfactants, coupling agents, antistatic agents, oils, flame retardants, ultraviolet stabilizers, internal lubricants, antioxidants, and processing aids. At times it may be desirous that the fibrous porous backing has a film (such as polyester teraphthalate) laminated to the back non-abrasive coated side to provide a barrier layer.

Bonded to at least one surface of the fibrous porous backing is the abrasive coating. The abrasive coating is formed from an abrasive slurry comprising a plurality of abrasive particles distributed throughout a water soluble binder precursor.

Abrasive Particles

The abrasive particles typically have a particle size ranging from about 0.05 to 10 micrometers, usually between about 0.1 to 5 micrometers and preferably between 0.1 to 3 micrometers. This preferred particle size range is found to be most beneficial in generating an Ra value of between about 30 to about 50 angstroms. If the abrasive particle size is too large, then the resulting Ra value will be too large, i.e., greater than about 50. If the abrasive particle size is too small, then the resulting Ra value will be too small, i.e., less than about 30. It is also preferred that the abrasive particle size distribution be very tightly controlled. The tight distribution is preferred to minimize the amount of wild scratches.

The abrasive particles have a Moh hardness of at least about 8, more preferably above 9. Examples of such abrasive particles include fused aluminum oxide, ceramic aluminum oxide, white fused aluminum oxide, heated treated aluminum oxide, silicon carbide, alumina zirconia, diamond, ceria, cubic boron nitride, garnet, and combinations thereof. The term abrasive particles also encompasses when single abrasive particles are bonded together to form an abrasive agglomerate.

Binder Precursor

The binder precursor is a water soluble polymer and remains water soluble after the binder precursor is coated onto the fibrous backing and dried. Examples of such water soluble resins include polyvinyl alcohol, starch, casein, vinyl acetate, polyethylene glycols, polypropylene glycols, gelatins and the like. Polyvinyl alcohol having a number-average molecular weight from about 20,000 to 80,000 is the preferred water soluble binder.

The binder solids content of the water soluble binder precursor coating composition (before drying) is in the ratio range of from about 1:8 to 1:4 binder solids:water, respectively, by weight, and preferably 1:5 to 1:7 binder solids-:water, respectively, by weight.

The binder precursor may further contain a non-water soluble polymer or non-water soluble polymer precursor. However, the chemistry and the amount of these materials should be such that they do not adversely affect the erodibility of the abrasive coating.

The binder precursor is typically in a liquid state or an uncured or non-polymerized state. After the abrasive slurry is coated onto the porous backing, the binder precursor is dried to a solid or nearly solid state. Once the binder precursor is dried it is then converted into a binder and the abrasive slurry is converted into an abrasive coating.

The ratio in the abrasive coating of the abrasive particles-:binder, by weight, is preferably between 7:1 to 3:1, preferably between 6:1 to 4:1, respectively.

Additives

The abrasive coating can further comprise optional additives, such as, for example, fillers (including grinding aids), fibers, lubricants, wetting agents, thixotropic materials, surfactants, pigments, dyes, antistatic agents, coupling agents, plasticizers, and suspending agents. The amounts of these materials are selected to provide the properties desired. The use of these can affect the erodability of the abrasive coating.

Examples of antistatic agents include graphite, carbon black, vanadium oxide, humectants, and the like. These antistatic agents are disclosed in U.S. Pat. Nos. 5,061,294 (Harmer et al.); 5,137,542 (Buchanan et al.), and 5,203,884 (Buchanan et al.) incorporated herein by reference.

A coupling agent can provide an association bridge between the binder precursor and the filler particles or abrasive particles. Examples of coupling agents include silanes, titanates, and zircoaluminates. A preferred silane coupling agent is commercially available from Union Carbide under the trade designation "A-174". The abrasive slurry (binder, additives, plus abrasive particles) preferably contains anywhere from about 0.01 to 3% by weight coupling agent based on total weight of the abrasive slurry. The abrasive particles can be pretreated with the coupling agent, i.e., the coupling agent is applied directly to the surface of the abrasive particle. Alternatively the coupling agent can be mixed into the abrasive slurry.

An example of a suspending agent is an amorphous silica particle having a surface area less than 150 square meters/gram that is commercially available from DeGussa Corp., under the trade name "OX-50".

Method of Making the Abrasive Article

The coated abrasive article of the invention can be made by the following method. An abrasive slurry is prepared by mixing together abrasive particles, the binder precursor, and optional additives. The preferred mixing technique is a ball mill mixer with glass or ceramic media. The ball mill aids in preventing agglomeration of the abrasive particles. The abrasive slurry is coated onto at least one side of the porous fibrous backing by any conventional technique such as roll coating, knife coating, die coating, spraying or curtain coating. During coating, some of the abrasive slurry will penetrate into the backing, however, the abrasive slurry will not completely seal the backing. Next, the binder precursor is dried and the abrasive coating is formed. The drying conditions will depend upon the chemistry of the binder precursor, but typical drying conditions include heating from about 80° to 150° C. for between 2 to 10 minutes.

The preferred coating technique is to use a coating technique which produces a uniform thickness, continuous or substantially continuous coating on a surface of the backing, such as by using knurled roll coating, roll coating, spray coating, die coating, curtain coating, extrusion knife coating, and the like. The thickness of the abrasive coating will range between 3 to 25 micrometers, preferably between 5 to 15 micrometers. It is also within the scope of this invention to coat the abrasive slurry in a discontinuous pattern over the surfaceof the backing, such as coating the abrasive coating as stripes or dots on the backing.

Figure 4:
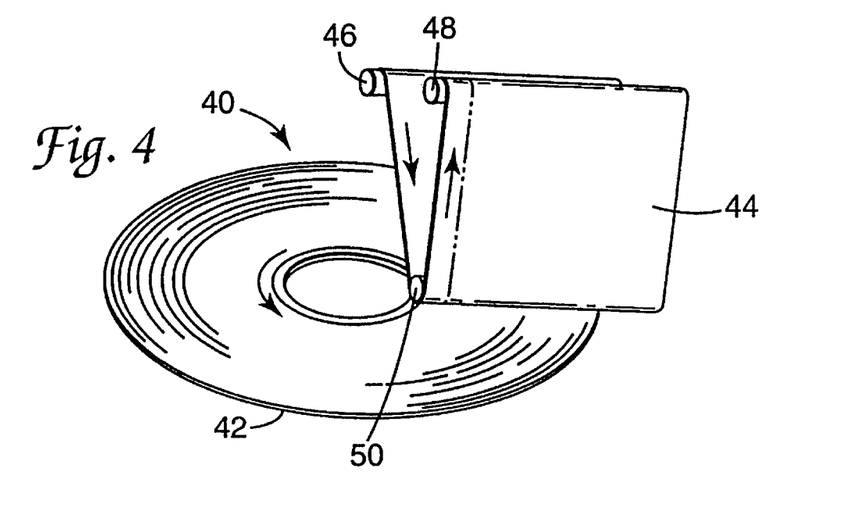
FIG. 4 is a schematic of a texturing apparatus for use with the method of the present invention.

FIG. 4 is a schematic representing a texturing apparatus 40 for use with the method of the present invention. Although the texturing of only one side of the substrate 42 is depicted, it is understood that both sides of the substrate 42 can be typically textured simultaneously by separate abrasive articles or by the same abrasive article. Substrate 42 is generally between 50 to 200 millimeters in diameter, usually between 60 to 150 mm. The substrate 42 is installed on a burnishing machine, such as a EDC 800C HDF brand burnishing machine from the Exclusive Design Company (EDC), San Mateo, Calif. The machine spins the substrate 42 between about 50 to 700 rpm, resulting in a surface speed on the disk of between about 7.5 to about 440 meters/minute. The abrasive article 44 of the invention is preferably provided in a continuous roll form having a width between 20 to 60 millimeters, preferably between 25 to 50 mm. The continuous roll of the abrasive article 44 is unwound from one station 46 to a second station 48. Shortly after station 46, abrasive article 44 is exposed to a water spray (not shown) to soften the water soluble binder of the abrasive article construction. After the water spray, the abrasive article 44 contacts the metal coating on substrate 42 with the aid of a roller 50 as substrate 42 rotates. Roller 50 has a preferred diameter of about 50 mm and is preferably constructed of an elastomeric material having a Shore A durometer of about 50. The texture cycle time is generally about 30 seconds. The force between the abrasive article 44 and the metal coating on substrate 42 is between 0.1 to 4 kg, preferably between 0.5 and 3 kg, for a contact length of 31.1 mm using a rubber roll having a diameter of 50 mm and a Shore A hardness value of 50. If the pressure is too high, the resulting surface finish, Ra, will be too high, i.e., greater than about 7 nanometers (0.0070 micrometers). If the pressure is too low, then the scratch height will be low and the surface finish will be too low, i.e., less than about 2 nanometers (0.0020 micrometers). The preferred method includes oscillating roller 50 in a radial direction relative to the substrate 42 during the texturing process. The radial oscillation ensures that the scratches formed by the abrasive article 44 are not concentric on the substrate 42, but are, instead, substantially circumferential with random crossings. During texturing, the abrasive article 44 is also indexed at a controlled rate between stations 46 and 48 to provide a known and uniform abrading rate to the metal coating on substrate 42. The indexing speed of the abrasive article 44 is between 25 to 400 mm/minute, preferably between 50 to 250 mm/min. The combination of the indexing abrasive article 44 and the oscillating roller 50 provides the random, substantially circumferentially spaced scratches desired. The rigid substrate 42 is typically cleaned to remove any debris or swarf after texturing. After cleaning, any conventional magnetic coating can be applied over the scratches. In a typical thin-film metal coated rigid magnetic media disk, a coating, such as chrome, is applied over a textured nickel/phosphorus coating. An additional coating of a magnetic material is applied over the chrome coating, for example, a CoXY alloy, where Co is cobalt, X can be platinum or tantalum, and Y can be chrome or nickel. Finally a carbon coating is applied over the magnetic coating.

The abrasive article used in the method of the present invention can also be used in abrading or polishing applications other than for the texturing of thin film rigid disks. It is theorized that this abrasive article would be a good replacement for any application which uses loose abrasive slurries or fine grade fixed abrasives (such as lapping films). Examples of such applications include eyeglass lens polishing, stone and gem polishing, glass (stemware, TV tubes and screens), jewelry (gold, silver, etc.), and computer, video cassette recorder heads, and fiber optic polishing.

Ra is a mathematical term used in the measuring of surface roughness. Ra is the arithmetic average deviation of the absolute values of the roughness profile from the mean line or center line. The center line divides profiles such that all areas above it are equal to all areas below it. Ra is usually reported in micrometers, angstroms, or nanometers.

EXAMPLES

The following non-limiting examples will further illustrate the invention. All parts, percentages, ratios, etc., in the examples are by weight unless otherwise indicated. The following abbreviations are used throughout:

PEG: polyethylene glycol, commercially available from Union Carbide under the trade designation Carbowax "600";

PVA1: polyvinyl alcohol binder, number-average molecular weight of approximately 25,000, commercially available from E. I. Du Pont de Nemours & Co. under the trade designation "ELVANOL 51-05";

PVA2: polyvinyl alcohol binder, number-average molecular weight of approximately 80,000, commercially available from E. I. Du Pont de Nemours & Co. under the trade designation "ELVANOL 50-40";

1-octanol: as surfactant, commercially available from Fisher Co.;

WAO: white aluminum oxide particles.

GENERAL METHOD FOR PREPARING THE ABRASIVE ARTICLE

The abrasive articles of the invention were prepared by the following general method. An abrasive slurry consisting of the listed materials was prepared by blending with a ball mill until the slurry was homogenous. The slurry was then coated at a weight (i.e., application rate) of about 26 g/m$^2$ onto a surface of the fibrous backing using a knife coater. The coated backing was then dried in a conventional oven at 120° C. for 3 minutes.

Texturing Procedure

The texturing test was performed on a rigid disk using the method of the present invention. A model 800C HDF Rigid Disk Burnisher, manufactured by Exclusive Design Co., San Mateo, Calif., was used. The rigid disk substrate was a nickel/phosphorus (NiP) plated aluminum disk (95 mm diameter) rotated at 100 rpm. The abrasive article of the present invention was cut into a 51 mm wide abrasive strip having an extended length. Rolls of the abrasive strip were installed on a tape cassette that had a supply reel with the unused abrasive article and a take-up reel with the used abrasive article. Two sets of abrasive tape cassettes were tested. One cassette was used to texture the top surface of the rigid disk, and the other cassette was used to texture the bottom surface of the rigid disk. The feed rate of the abrasive tape and pressure between the tape and disk substrate were varied as stated in the specific Examples. About 2.5 cm of the new abrasive tape was exposed to and contacted with an aqueous coolant mist prior to texturing. The aqueous coolant mist was comprised of 5% by volume of "RECOOL 85" solution, which was a solution of sodium tolytriazole alkanolamine, commercially available from Mangill Chemical Co. In this regard, abrasive tape was prewet with the coolant to allow time for the binder to dissolve and release abrasive particles before the abrasive article was contacted with the disk. This prewetting of the abrasive article was done on the surface of abrasive coating of the abrasive tape at a location 2.5 cm in front of and before the location of the abrasive article-disk interface, thus providing 10 to 30 seconds for the binder to dissolve before contact was initiated with the disk surface. During the texturing process, a 5% by volume solution of the "RECOOL 85" in an aqueous coolant mist form was also dripped onto a cleaning fabric which was applied to the surface of the rigid disk to transfer the aqueous coolant to the surface of the disk. Two cleaning tape cassettes (Type TJ Cleaning Tape, manufacture by Thomas E. West Co.) were also used in this test. One cassette was used to clean the top surface of the rigid disk, and the other was used to clean the bottom surface of the rigid disk. At the surfaces of the rigid disk, the abrasive tapes and cleaning tapes were passed over a Shore A 50 durometer elastomer roller which was oscillated in a radial direction relative to the disk using a mechanical vibrator with approximately 3 to 6 mm of travel. The endpoint of the test was 20 seconds. The surface of the textured rigid disk was then measured to determine the surface properties of each sample.

EXAMPLE 1

An abrasive article for Example 1 was prepared according to the General Method for Preparing the Abrasive Article. A porous woven twill cotton backing, approximately 250 micrometers thick, was coated with WAO grade WA 3000 (approximately 4 micrometer particle size or diameter).

EXAMPLE 2

An abrasive article for Example 2 was prepared the same as Example 1 except WAO grade WA 4000 (approximately 3 micrometers in particle size) was used.

COMPARATIVE EXAMPLE A

Comparative Example A was an abrasive article comprising a polyester teraphthalate backing with an abrasive coating containing a partially crosslinked polyester resin and 2 micrometer aluminum oxide. This product is commercially available from 3M Company, St. Paul, Minn. under the trade designation "IMPERIAL TR3".

Electron photomicrographs confirmed that Examples 1 and 2 produced a better line density and overall surface quality on textured rigid magnetic disks (Ni-P surface film) under the same texturing conditions (interface pressure of 1.3 kg and a tape speed of 7.6 cm/minute) than Comparative Example A.

EXAMPLE 3

The abrasive article for Example 3 was prepared the same as Example 1 except WAO having an average particle size of 3 micrometers was used.

EXAMPLE 4

The abrasive article for Example 4 was prepared the same as Example 3 except WAO having an average particle size of 2 micrometers was used.

Examples 3 and 4 were tested at 5 different runs for texturing test parameters. Table 1 lists the following five run designations used at the indicated different texturing parameters. The interface pressure value is given in kg and the tape speed is given in cm/min. Table 2 reports the Ra and standard deviation of the Ra measurements (in nanometers).

TABLE 1

| Run | interface pressure | tape speed |
|---|---|---|
| 1 | 1.12 | 15.2 |
| 2 | 1.12 | 5.1 |
| 3 | 1.48 | 15.2 |
| 4 | 1.48 | 5.1 |
| 5 | 1.30 | 10.2 |

TABLE 2

| Example-Run | Ave. Ra | S.D. Ra |
|---|---|---|
| 3-1 | 3.29 | 0.31 |
| 2-1 | 2.76 | 0.22 |
| 3-2 | 4.15 | 0.28 |
| 2-2 | 3.57 | 0.54 |
| 3-3 | 3.60 | 0.37 |
| 2-3 | 3.01 | 0.31 |
| 3-4 | 3.99 | 0.45 |
| 2-4 | 3.34 | 0.39 |
| 3-5 | 3.95 | 0.46 |
| 2-5 | 2.97 | 0.33 |

EXAMPLE 5

The abrasive article of Example 5 was prepared according to the General Method for Preparing the Abrasive Article. A porous nonwoven cotton backing, 178 micrometers thick, was coated with WAO grade having an average particle size of 2 micrometers.

COMPARATIVE EXAMPLE B

Comparative Example B was prepared according to the General Method for Preparing the Abrasive Article. A nonporous (sealed) polyester teraphthalate film backing, 50 micrometers thick, was coated with WAO having an average particle size of 2 micrometers.

Example 5 and Comparative Example B were used to texture a rigid disk according. The above-described Texturing Procedure was used with the alteration that a 30 second cycle time was used. The following mean, median, and standard devaiation Ra data (in angstroms), summarized in Table 3, was generated from 20 and 19, respectively, measurements taken across the textured surface of the disk.

TABLE 3

|  | Example 5 | Comp. Ex. B |
|---|---|---|
| Mean Ra | 43.18 | 45.25 |
| Median Ra | 43.6 | 45.3 |
| S. D. Ra | 1.73 | 5.27 |

Figure 5:
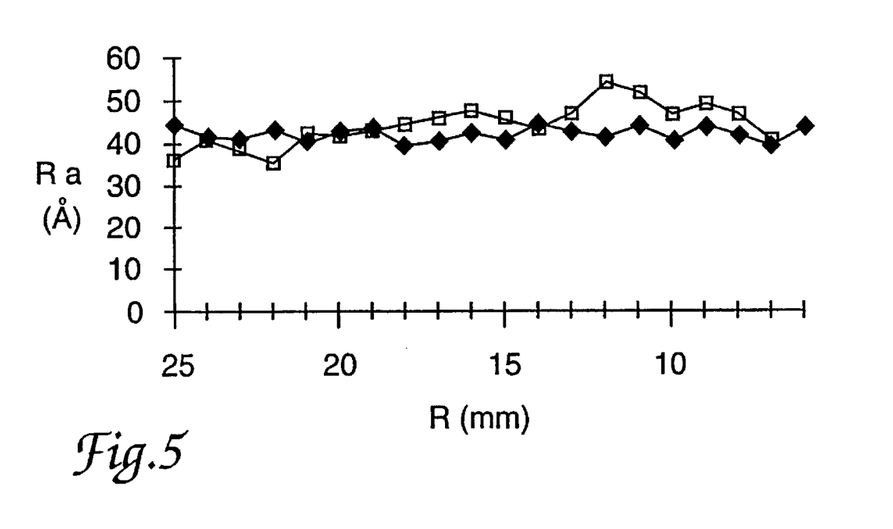
FIG. 5 is a line plot of the surface finish Ra measured across the surface of disks textured with an abrasive article of the method of the present invention and a Comparative Example.

The optimum disk finish would have consistent Ra measurements across the disk with a low standard deviation. The areas of lower Ra on the Comparative example B were visible as shiny bands. FIG. 5 shows a graph of Ra (angstroms) measured across the surface of the textured disk, from outer diameter to inner diameter, with the locations of the measurements indicated as the radial distance R from the inner diameter of the disk (i.e., the center hole). Both Table 3 and FIG. 5 show inconsistent texture across the radius of the textured disk of Comparative Example B. The Ra values for Example 5 are indicated by the symbol "♦" while Ra values for the Comparative Example B are indicated by the symbol "■". The Figure shows the deviation across the disk when textured with Comparative Example B, and Table 3 shows a significantly larger standard deviation with the Comparative Example.

Various modifications and alterations of this invention will become apparent to those skilled in the art without departing from the scope and spirit of this invention, and it should be understood that this invention is not to be unduly limited to the illustrative embodiments set forth herein.

We claim:

1. A method for texturing a surface of a metallic thin film of a magnetic disk substrate comprising the steps of:
   (a) frictionally contacting said surface of said metallic thin film with an abrasive article, wherein the abrasive article comprises an abrasive coating including a water-soluble binder material and abrasive particles, wherein said abrasive coating is adhesively attached to a flexible foraminous fibrous backing; and
   (b) abrading said surface of said metallic thin film by moving said metallic thin film and said abrasive article relative to one another with said abrasive coating being in contact with an aqueous liquid solution to form scratches in said surface of said metallic thin film, wherein said liquid solution is free of abrasive particles before said contact with said abrasive coating.

2. The method of claim 1, wherein said foraminous fibrous backing comprises a nonwoven fabric.

3. The method of claim 2, wherein said nonwoven fabric comprises polyester fibers.

4. The method of claim 1, wherein said water-soluble binder material is selected from the group consisting of polyvinyl alcohol, polyacrylamide, and polyethylene glycol.

5. The method of claim 1, wherein said water-soluble binder material comprises polyvinyl alcohol.

6. The method of claim 1, wherein said metallic thin film comprises Ni-P.

7. The method of claim 1, wherein said abrasive article comprises a sheet configuration frictionally conveyed over said surface of said metallic thin film by reel-to-reel means.

8. The method of claim 1, wherein said abrading step forms substantially circumferential scratches in said surface of said metallic thin film with an Ra of between about 20 angstroms to about 70 angstroms.

9. The method of claim 1, wherein said abrading step forms substantially circumferential scratches in said surface of said metallic thin film with an Ra of between about 30 angstroms to about 50 angstroms.

10. The method of claim 1, wherein said abrasive coating comprises said abrasive particles and said water-soluble binder in a weight ratio of 7:1 to 3:1, respectively.

11. The method of claim 1, wherein said magnetic disk substrate comprises a rigid metal base having opposing major surfaces, said metallic thin film formed on at least one of said major surfaces.

12. The method of claim 1, wherein said rigid magnetic disk substrate comprises a circular shape and a central axis, and further wherein said step of abrading further comprises rotating said rigid substrate about said central axis to form substantially circumferential scratches.

13. The method of claim 12, wherein said step of rotating further comprises forming said circumferential scratches at a speed of at least 7.5 meters per minute at an interface between said metallic thin film and said abrasive article.

14. The method of claim 1, wherein said abrasive particles have an average particle size of about 0.1 to about 5 micrometers.

15. The method of claim 1, wherein said abrasive particles comprise aluminum oxide.

16. The method of claim 1, wherein said step of abrading further comprises oscillating said abrasive article in a direction substantially perpendicular to a direction of travel of said rigid substrate during said abrading.

17. The method of claim 1, further comprising the additional step after said abrading step of forming at least one magnetic layer on said surface containing said scratches.

18. A method for texturing a surface of a metallic thin film of a magnetic disk substrate comprising the steps of:
   (a) providing an abrasive article comprising an abrasive coating including a water-soluble binder material and abrasive particles, wherein said abrasive coating is adhesively attached to a flexible foraminous fibrous backing and comprises an exposed surface;
   (b) contacting said surface of said abrasive coating with an aqueous liquid solution, wherein said liquid solution is free of abrasive particles before said contact with said abrasive coating;
   (c) frictionally contacting said surface of said metallic thin film with said abrasive article; and
   (d) abrading said surface of said metallic thin film by moving said metallic thin film and said abrasive article relative to one another to form scratches in said surface of said metallic thin film.

19. The method of claim 18, wherein said abrasive coating comprises a surface, and further comprising the step of wetting said surface of said abrasive coating with an aqueous solution prior to said step of frictionally contacting said surface of said metallic thin film with said abrasive article.

* * * * *

UNITED STATES PATENT AND TRADEMARK OFFICE
CERTIFICATE OF CORRECTION

PATENT NO.: 5,586,926

DATED: December 24, 1996

INVENTOR(S): Eric D. Wedell and Darlene N. Strecker

It is certified that error appears in the above-identified patent and that said Letters Patent is hereby corrected as shown below:

Col. 3, line 7    "unifromly" should read --uniformly--

Col. 5, line 11    "20angstroms" should read --20 angstroms--

Col. 5, line 21    "The" should read --the--

Col. 5, line 67    "substarte" should read --substrate--

Col. 7, line 5    "Ark." should read --Arizona--

Col. 11, line 18    "surfaceof" should read --surface of--

Col. 14, line 65    "devaiation" should read --deviation--

Signed and Sealed this

Twenty-ninth Day of April, 1997

Attest:

BRUCE LEHMAN

Attesting Officer     Commissioner of Patents and Trademarks